United States Patent [19]

Nimmo et al.

[11] Patent Number: 5,287,489
[45] Date of Patent: Feb. 15, 1994

[54] METHOD AND SYSTEM FOR AUTHORING, EDITING AND TESTING INSTRUCTIONAL MATERIALS FOR USE IN SIMULATED TRAILING SYSTEMS

[75] Inventors: George Nimmo, Covina; Mark Johnson, Upland; Peter Hedger, Yorba Linda, all of Calif.

[73] Assignee: Hughes Training, Inc., Arlington, Tex.

[21] Appl. No.: 605,625

[22] Filed: Oct. 30, 1990

[51] Int. Cl.$^5$ .............................................. G06F 15/20
[52] U.S. Cl. ............................ 395/500; 364/DIG. 2; 364/DIG. 1; 364/221.3; 395/20; 395/23
[58] Field of Search ................ 364/DIG. 1 MS Files, 364/DIG. 2 MS Files, 801; 395/500, 200, 600, 650, 700, 800, 100, 155, 156, 157, 20, 23; 434/29, 30, 31, 32, 33, 34, 35, 36, 37, 38, 39, 40, 41, 42, 43, 44, 45, 46, 47, 48, 59

[56] References Cited

U.S. PATENT DOCUMENTS

| | | | |
|---|---|---|---|
| 4,070,705 | 1/1978 | Lockwood et al. | 395/500 |
| 4,797,854 | 1/1989 | Nakazaki et al. | |
| 4,914,568 | 4/1990 | Kodosky et al. | |

FOREIGN PATENT DOCUMENTS

| | | |
|---|---|---|
| 0262759 | 7/1987 | European Pat. Off. . |
| 0332322 | 2/1989 | European Pat. Off. . |
| 2127645A | 8/1983 | United Kingdom . |
| 2231982A | 5/1989 | United Kingdom . |

OTHER PUBLICATIONS

Transactions of the Institute of Electronics, Information and Communication Engineers, of Japan, vol. E73, No. 3, Mar. 1990, Tokyo JP, pp. 332-340; Masahiro Inui et al., p. 332, column 2, paragraph 4—p. 339, column 1, paragraph 4.

Wenger E. 'Artificial Intelligence and Tutoring Systems' 1987 Morgen Kaufmann, Los Altos., US Chapter 5 "Interactive Simulations: Communicating Mental Models", pp. 79-88, p. 79, paragraph 1—p. 88, paragraph 1.

*Primary Examiner*—Robert B. Harrell
*Attorney, Agent, or Firm*—Wanda K. Denson-Low

[57] ABSTRACT

The present invention provides an authoring tool (10) which simplifies the authoring and editing functions of a simulated training system. The authoring tool (10) utilizes a development tool and method (40) which condenses authoring, editing and testing into one environment. This authoring tool, (10) referred to as the learn mode courseware tool, includes a user interface (70) which permits the author to produce, edit and test procedural logic structure. In addition, the system (10) permits the author to preview audio, video, and graphics displays, and also permits the author to interact with a representation of many trainer devices (18, 20, 26) at a single trainer device (32).

9 Claims, 7 Drawing Sheets

```
                    LMT VERSION 0.00

THIS PROCEDURE WAS WRITTEN FOR TRAINING SYSTEM:

CREATION DATE:                           LATEST REVISION DATE:

TRAINER SYSTEM TITLE:
INITIAL TRAINER STATE:
                                         PROCEDURE VERSION NUMBER:
PROCEDURE NAME:                          CLASSIFICATION:
TRAINER VEHICLE NUMBER
PROCEDURE TITLE

THIS PROCEDURE DESCRIBES 0000 EVENTS AS WRITTEN FOR 0000 STEPS

PRESS F7 TO AUTHOR/EDIT THIS PROCEDURE
PRESS F8 TO COMPILE THIS PROCEDURE
PRESS F9 TO PLAYBACK THIS PROCEDURE ON THE CC
PRESS F13 TO TEST THIS PROCEDURE ON A GLASS TRAINER
```

Fig-4

```
TRAINER SYSTEM:                  PROCEDURE:                       DATE:
EVENT NUMBER:                    IN STEP NUMBER:

COMPONENT:
ACTION:
POSITION:

EVENT IN SEQUENCE? N             OPTIONAL EVENT? N
SAVE POINT? N                    ACTION PERFORMED BY? P

SPECIAL VERB DATA (WSIM/IF)          - TO REVIEW/MODIFY, PRESS F14
REMEDIATION MEDIA LEVEL: NORMAL      - TO REVIEW/MODIFY, PRESS F17
INSTRUCTION MEDIA UTILIZATION        - TO REVIEW/MODIFY, PRESS F18
SIMULATION OVERRIDE CONDITION: NONE  - TO REVIEW/MODIFY, PRESS F19
COMPILER OUTPUT                      - TO REVIEW, PRESS F20
FREEZE SIMULATION?                   - PRESS F11
ENTER FREEPLAY/CMR MODE?             - PRESS F12
TEST EXISTING PROCEDURE?             - PRESS F13

STEP COMPLETE?                   EVENT COMPLETE?
```

Fig-5

CIRCULAR ANALOG

LINEAR ANALOG

SHAFT POSITION

- [ ] CLOCKWISE/UP/RIGHT MOVEMENT
- [ ] COUNTERCLOCKWISE/DOWN/LEFT MOVEMENT
- [ ] ANY MOVEMENT
- [ ] SPECIFIC VALUE/POSITION
- [ ] CANCEL
- [ ] OK

74

TYPE IN VALUE/POSITION:

(PROMPT POSSIBLE RANGE FORM I/O LIST

____ ____ ____ ____ _

TOLERANCE: ____

(STICKY FIELD WITH DEFAULT VALUE-20%)

METHOD AND SYSTEM FOR AUTHORING, EDITING AND TESTING INSTRUCTIONAL MATERIALS FOR USE IN SIMULATED TRAILING SYSTEMS

CROSS REFERENCE TO RELATED APPLICATION

This invention contains material related to the co-pending patent application Ser. No. 995,569, filed Dec. 12, 1992, a file wrapper continuation of Ser. No. 07/605,621, now abandoned, entitled "Glass Trainer" which is assigned to the same assignee as the present application.

BACKGROUND OF THE INVENTION

1. Technical Field

This invention relates to simulation and training systems and more particularly to an interactive system for authoring and editing such systems.

2. Discussion

Many complex systems place great demands on their operators. As a result, operators of many such systems require many hours of training to reach a desired level of proficiency. Examples of such systems having high training costs include sophisticated stationary process control systems, as well as ground and airborne vehicles.

Since it is not always practical to train operators of such systems on actual equipment, various kinds of simulators have been developed. For example, for pilot training, hardware mockups are commonly used. When coupled with a computer generated simulated exterior view, these mockups can give students valuable experience with the myriad of controls and situations they will encounter when operating the actual aircraft.

Unfortunately, hardware mockups are relatively expensive to construct and may quickly become obsolete when changes in hardware occur. To overcome this problem, a simulation and training system has been developed which avoids the use of hardware mockups by simulating the hardware on video screens. This system is disclosed in co-pending patent application Ser. No. 995,569, filed Dec. 12, 1992, a file wrapper continuation of Ser. No. 07/605,621, now abandoned, entitled "Glass Trainer", which is hereby incorporated by reference. In the Glass Trainer system views of an operating environment such as an aircraft cockpit are stored on a video storage means and presented on a screen. Manipulable controls and changeable displays are presented as computer generated graphics overlays on the video monitor. The user can manipulate these controls by means of a touch screen. This system eliminates the necessity of building a hardware mockup of the operating environment since all of the necessary views of the environment and controls appear on one or more video monitors. The use of overlay images to simulate the appearance of the controls and displays in a plurality of states means that separate images are not required for each possible set of states of the system. In addition, the appearance of the simulated environment can be easily changed by simply photographing a new image of the new revised operating environment and by changing the appearance of the overlay graphics.

While representing a significant advance over conventional hardware mockup systems, the Glass Trainer system presents some complexities in the task of authoring and editing the simulation and training displays and procedures. For example, the author must consider that one change in a sequence or graphic display in one particular training sequence may affect numerous other parts and aspects of a particular training program. In addition, the author of such training procedures needs to be able to test various portions of the simulation immediately after making the changes without going through the entire training course.

Thus, it would be desirable to provide an interactive tool for authoring and editing simulated training systems such as the Glass Trainer that simplifies the authoring and editing process. Further, it would be desirable to have such an authoring tool which reduces the time required to edit and test the training procedure. Also, it would be desirable to have such an authoring tool which provides immediate feedback to the author regarding changed procedures as they are being developed.

SUMMARY OF THE INVENTION

Pursuant to the present invention an authoring tool is provided which simplifies the authoring and editing function of a simulated training system such as the Glass Trainer. The authoring tool utilizes a development tool which condenses authoring, editing and testing into one environment. This authoring tool, referred to as the Learn Mode Courseware Tool includes a user interface which permits the author to produce, edit and test procedural logic structure. In addition, the system permits the author to preview audio, video, and graphics displays, and also permits the author to interact with a representation of many trainer devices at a single trainer device.

In accordance with another aspect of the present invention a method is provided for authoring training courseware for a system such as the Glass Trainer. The method includes the step of analyzing the authoring required, including establishing the extent of new authoring or changes required to previous authored portions, and the affect of authored changes on various portions of the training system, and developing a plan for implementation. The method also includes the step of implementing the changes specified in the step of analyzing, including implementing changes to the simulation, audio, video, and graphics. Next, the method includes a step of testing these simulation changes performed in the implementing step and changing the training system procedure by integrating the tested simulation, audio, video and graphics changes into the training system procedure.

BRIEF DESCRIPTION OF THE DRAWINGS

The various advantages of the present invention will become apparent to one skilled in the art by reading the following specification and by reference to the following drawings in which:

FIG. 4 is a detailed view of the preamble screen shown in FIG. 3;

FIG. 5 is a detailed view of the author/edit screen shown in FIG. 3;

FIG. 6 is a diagram of a sub-menu which assists the author in selecting specific components via touch screen input in accordance with the present invention.

DETAILED DESCRIPTION OF THE PREFERRED EMBODIMENTS

Figure 1:
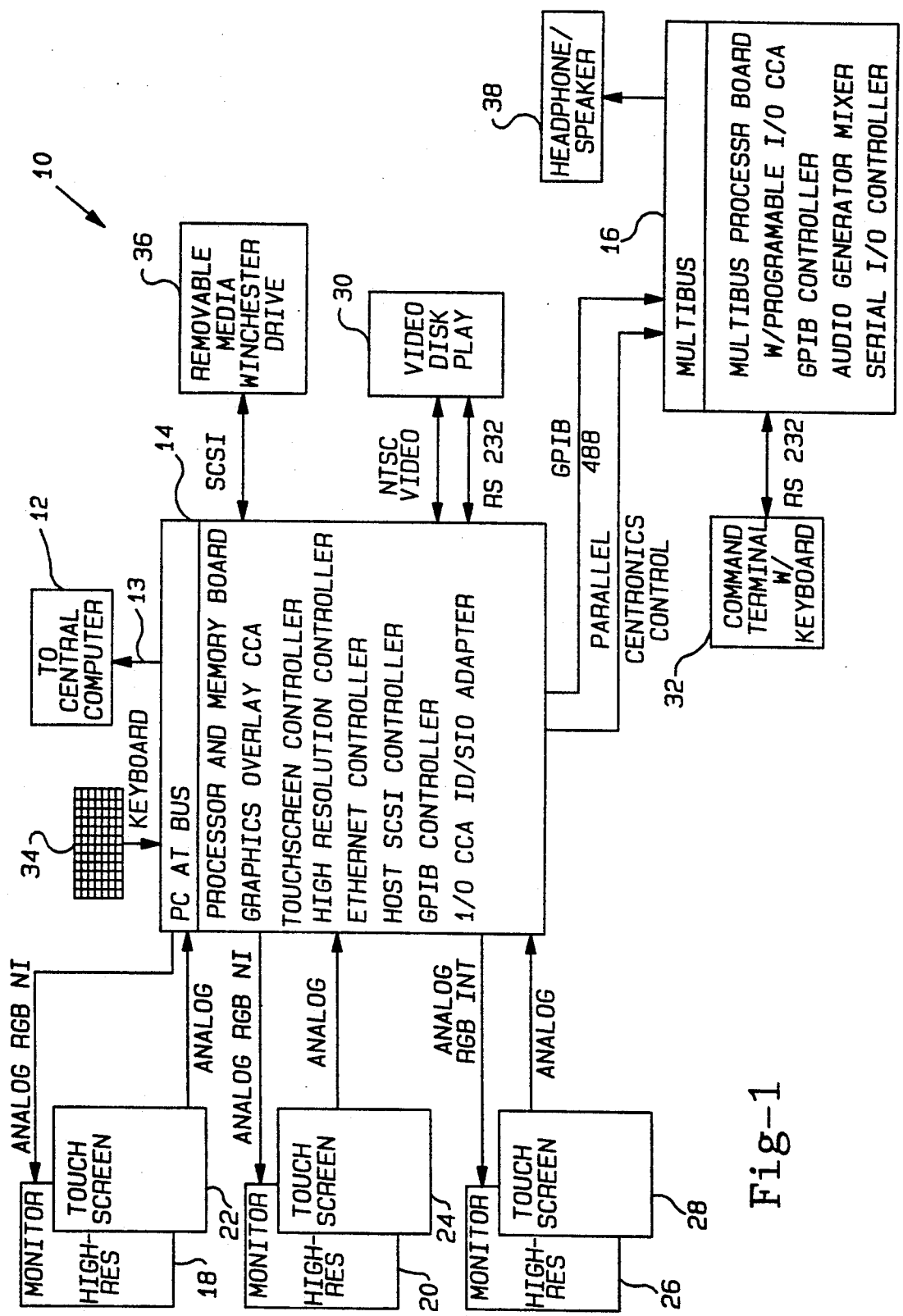
FIG. 1 is a block diagram of the hardware components of the Glass Trainer system adapted to operate the learn mode courseware tool in accordance with the present invention.

Referring to FIG. 1 there is shown a diagram of a glass trainer system described in the incorporated by reference patent application, which has been adapted to be utilized with the learn mode courseware tool 10 in accordance with the present invention. The learn mode courseware tool in accordance with the present invention consists of the computational equipment, auxiliary equipment and computer programs to support this equipment and perform the functions described below. Courseware is defined as a high level structured coded description of a step-by-step series of events used to control the progress of a student through a procedure. It allows the control of multi-media instructional feedbacks and testing. The learn mode courseware tool 10 includes the following capabilities: courseware procedure authoring; courseware procedure editing; courseware procedure testing; and audio/video/graphics media checkout. The learn mode courseware tool is a developmental tool that allows onscreen integration of procedure events, instructional feedback elements, and simulation produced responses. In accordance with the present invention, three phases of courseware development (1) authoring, (2) editing and (3) testing are condensed into one environment. The learn mode courseware tool enables the courseware author to produce, edit and test procedural logic structure. In addition, it enables the author to preview audio, video and graphic displays as well as interact with a representation of many trainer devices/panels at a single glass trainer device. In addition, a playback feature allows the author to step through a procedure, edit and test the design, and observe actions in simulation responses as a student would see them on the glass trainer.

The glass trainer system 10 with learn mode courseware tool 10 in accordance with the present invention includes a central computer 12 which may comprise, for example, a Micro Vax II computer system, primary memory, mass storage, terminals and printers. The communication link 13 to the central computer 12 is an ethernet coaxial LAN type pathway utilizing TCP/IP communications protocol. The central computer 12 is connected to a PC AT bus card rack assembly 14 which includes a microcomputer with 4MB of memory, an IEEE-488 controller, two high resolution graphics generators, one graphics overlay card, a disc controller, and three touch screen controllers. The PC AT bus card rack assembly 14 is connected to a multibus card rack assembly 16 which includes two microcomputers with 8MB of memory on each, an RS-232 port, an IEEE-488 controller, and an audio delivery system controller. These circuit cards provide the interface between the PC AT bus card rack assembly 14 and the multi-bus card rack assembly 16 and audio delivery system. In addition, the glass trainer system with learn mode courseware tool 10 includes two high resolution color graphic monitors 18 and 20. Each of these monitors 18, 20 will have a touch screen 22, 24 which allows operator input that correlates with displayed video high resolution graphics.

One medium resolution color video monitor 26 with touch screen 28 inputs shall be provided for display of specific trainer devices. This monitor 26 displays video pictures from a video disc player 30 connected to the PC AT bus 14. The video pictures from the video disc player 30 are overlayed with graphics. The touch screen 28 allows operator input to correlate to graphics overlay touch areas and border buttons.

A command terminal with keyboard 32 displays instructional information and menus available to the user to assist in developing courseware procedures and in using the learn mode courseware tool 10 during courseware authoring, editing, and testing. The video disc player 30 provides storage and retrieval of training specific video images. For example, these may comprise different views of an aircraft cockpit. A keyboard 34 supplements the touch screens 22, 24, 28 for input of courseware procedure information. The keyboard may also be used during emulation of the various computerized trainers. A removable media Winchester drive 36 is a local mass storage disc capable of storing the courseware, simulation models, graphic overlay, and audio information for the procedure being emulated or generated. It can also store trainer software downloaded for testing. The removable discs should have a usable capacity of at least 44 Mega Bytes (MB) of memory. The audio delivery system 38 uses a speaker or headphones to deliver audio feedback to the user.

Computer security may be incorporated into the learn mode courseware tool 10 in a conventional manner to limit access to the system. For example, by requiring that the user enter a particular name and password before access is granted.

It is desirable that the learn mode courseware tool 10 has response times which are fast enough to facilitate the authoring and editing tasks. Thus, in accordance with the preferred embodiment of the learn mode courseware tool 10 shown in FIG. 1, the display of video/graphic information will occur within five seconds of data entry. Aural presentation of a typical 30 second audio message will occur within five seconds of data entry. Data entry screen response to touch screen selection of a glass component will occur within one second. Simulation response to events will occur in real time or within one second whichever is longer. Also, the time to download the system is no longer than five minutes from the time that the "initial trainer state" information is entered in the preamble screen (described below).

Configuration management will be facilitated by means of a "where used" list detailing for the trainer analyst where each procedure and instructional element is used. This will allow the analyst to determine the overall affects of the change to a common procedure. This function may reside in the central computer 12 rather than in the software courseware test bed.

Figure 2:
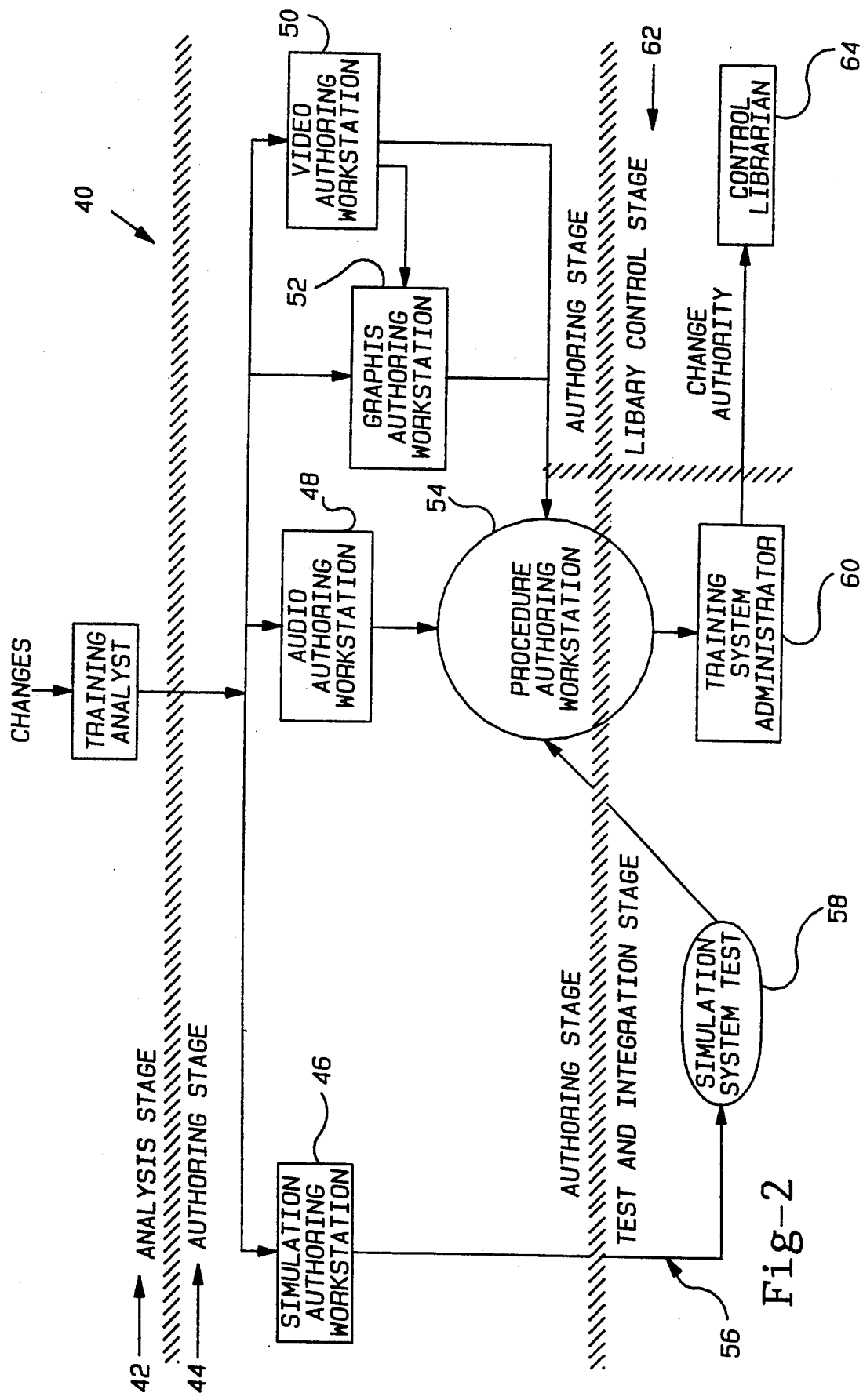
FIG. 2 is a diagram of the various steps performed during use of the learn mode courseware tool in accordance with the present invention.

Referring now to FIG. 2 there is shown a series of steps 40 in the courseware authoring/change process, including courseware procedure authoring, in accordance with the present invention. The first step is analysis 42. During the analysis step, a training analyst determines the extent of change or new authoring required, effects on other functions, a plan for implementation, and personnel work assignments. The second step is the authoring stage 44 during which the changes specified by the analyst are made to the simulation, audio, video, graphics, and procedures. These steps are performed at learn mode courseware tool work stations as illustrated in FIG. 2 by the following blocks: simulation authoring work station 46, audio authoring work station 48, video authoring work station 50, graphics authoring work station 52 and procedure authoring work station 54. The third step is the test and integration stage 56. As shown in FIG. 2 the simulation system test step 58 is where changes are tested and integrated on a glass trainer platform and edited as required. It should be noted that the learn mode courseware tool 10 integrates the procedure authoring portion 54 of the authoring stage 44 with the third stage 56.

After this, the training system administrator 60 will review and approve changes.

The final stage is the library control stage 62 where working changes are approved and released to the configuration management function which may be the control librarian 64.

The method in accordance with the present invention as shown in FIG. 2 assumes that instructional media such as video, audio, and graphics database information, and simulation aspects are already authored in steps 48, 50 and 52 and ready to be used before procedure authoring 54 begins. When this is not possible and parallel authoring is necessary, however, the learn mode courseware tool 10 shall allow instructional media to be simulated by stubs, (which are blank or placeholder frames and messages) until it is generated.

Figure 3:
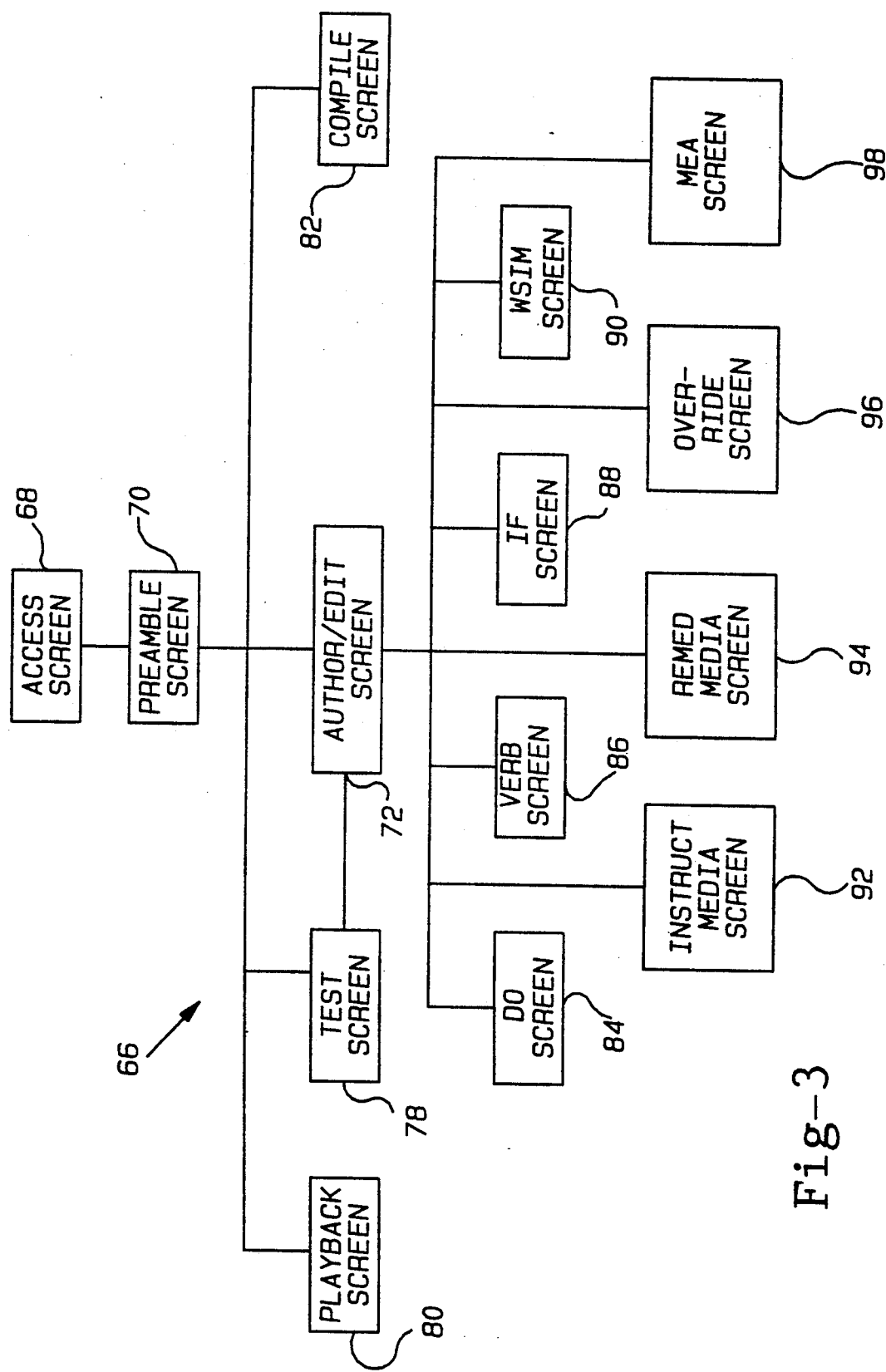
FIG. 3 is a diagram of the hierarchy of menus in the user interface of the learn mode courseware tool in accordance with the present invention.

The learn mode courseware tool 10 provides a user interface which in general works by providing menus with the options a user can make while generating courseware. These options include the commands to establish the logic structure of the lesson and the instructional material which can be presented in the lesson. A hierarchy 66 of the learn mode courseware tool 10 menus is shown in FIG. 3. The first screen will be the access screen 68 which will require the user to enter the proper identifying information to gain access to the system. The next screen, once access to the learn mode courseware tool 10 is permitted will be the preamble screen 70. The preamble screen 70 is shown in more detail in FIG. 4. This screen 70 will require the name of the training system, the creation date, latest revision date, and training system title. The learn mode courseware tool 10 will then prompt for the "initial trainer state". After this information is entered the learn mode courseware tool 10 will download to the software courseware test bed the required data for trainer operation. After the remaining preamble information has been entered, the user will select the author/edit or test function keys by pressing either the F7 or the F13 key. Alternatively, the playback and compile functions are available but are not required. These functions consist of the Playback Function which allows the user to step to current event, go to an event, review last event, set save point, go to a procedure, review current event, set a delay, or go to a save point; Compile Function allows the user to start a syntax, check start compilation, quit compilation, or print a PDE report.

Referring now to FIG. 5, the author/edit screen 72 is shown in more detail. The author/edit screen is initiated when the F7 function button is pressed while the preamble screen 70 is presented. The component action and position fields may be entered by typing in the information or alternatively via touch screen. For example, a hierarchy of component specific sub-menus may be used to select particular components for authoring and editing. For example, referring now to FIG. 6 an example is shown of the selection of a circular analog type component which may be selected by touch screen data entry. This will bring up another screen 74 which gives the user a choice of options of types of movement, specific values, position, etc. When the specific value/position selection is chosen another screen 76 prompts the user to type in a value/position from a possible range in an I/0 list. In addition, the tolerance may be selected.

Figure 7:
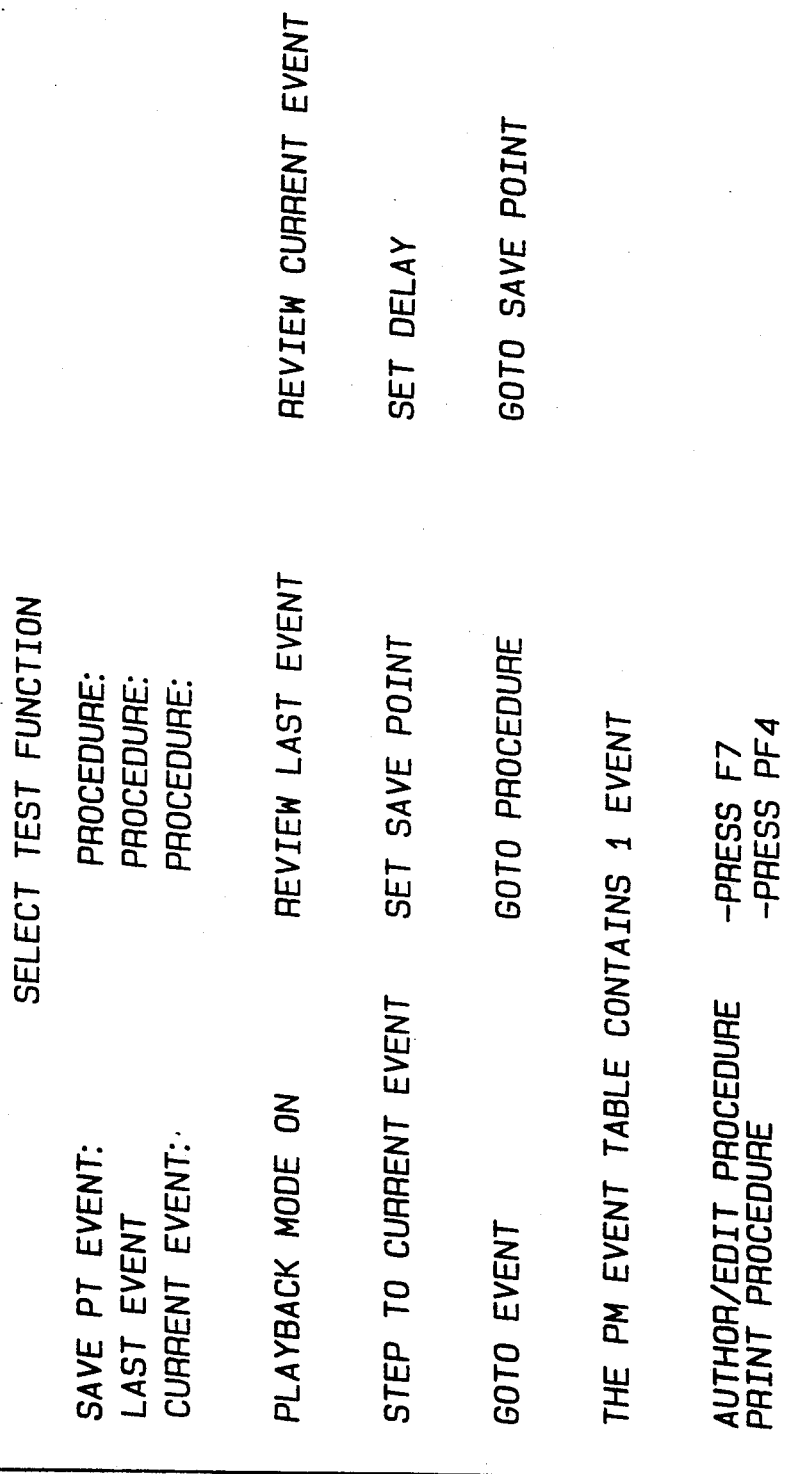
FIG. 7 is a detailed view of the test screen shown in FIG. 3.

The test mode may be initiated by means of function key F13 which will initiate the test screen 78 shown in FIG. 7. As indicated by the hierarchy in FIG. 3, the test screen may be initiated either from the author/edit screen 72 or from the preamble screen 70. When the author/edit screen 72 is initiated from the test screen 78 the particular event presented shall be the same as the current event on the test screen. Also shown in FIG. 3 is the playback screen which reiterates the courseware procedure, event by event, to allow the user to evaluate the courseware logic, and the compile screen 82 which compiles the procedure. In addition, from the author/edit screen 72 the user may proceed to one of a number of screens 84-98 which are used to author specialized courseware procedure functions.

Three primary functions of the learn mode courseware tool 10 procedure authoring, editing, and testing will now be described in more detail. The first authoring function of the learn mode courseware tool 10 supports previewing and defining procedural events by allowing an author to perform the events as he would on the actual vehicle hardware (via the glass interface). Glass components menus such as those shown in FIG. 6, enables the author to input component information via the touch screen. The learn mode courseware tool 10 will prompt the user with menus on a terminal to assist him in developing courseware procedures that integrate audio and video programs with graphic overlays, messages, and courseware instruction. As the procedure is authored, instructional feedback, which has already been authored at another work station will be selectable as appropriate and simulation will stay in sync to provide appropriate system responses. As authoring is accomplished, an annotated events table file will be generated or updated. This table consists of courseware procedures and events. The authoring function includes the capability of authoring procedure definition information using the preamble screen 70. In addition, initial conditions may be selected using the initial trainer state prompt on the preamble screen 70. Further, the author can define courseware logic during authoring. Courseware logic consists of the paths a student can follow when he runs the lesson. Examples of logic constructs available are permitted sequence of actions, branches based on the presence/absence of a malfunction, and remedial branches when the student makes an error.

The authoring function also includes the capability of selecting and viewing media used for prompting, feedback and remediation. The media may exist on a video disc 30, on the software courseware test bed disc drive, or in files resident on the central computer 12 which must then be transferred to the trainer. The author will be able to view output from simulation in a trainer like setting such as glass I/O. In addition, there is the capability to freeze and unfreeze simulation time while authoring. This will allow the author to pause while authoring and not incur timing problems due to internal simulation timers. The status shall be indicated on the author/edit screen 72 through the use of the function key prompt. When in freeze mode, the prompt for F11 is "unfreeze simulation?", and when not in freeze mode, the prompt shall be "freeze simulation?".

The free play mode allows an author to experiment with procedure changes without actually including the information in the procedure. Entry and exit from this mode shall be via a function key on the author/edit screen 72. The status will be indicated on the author/edit screen 72 through the use of the function key prompt. When in the free play mode, the prompt for F12 will "exit free play/CMR mode?" and when not in free play mode, the prompt shall be "enter free play/CMR mode?"

Upon exiting the free play mode, the author will be queried as to whether or not the free play mode was used to accomplish a condition monitor response (CMR) which is primarily used to detect state changes that are undetectable by only monitoring switch actions. If the response is no, then control will be turned to the author/edit screen and processing will continue at the point (simulation state) from which the free play mode was entered. If the response is yes, then the hardware will be updated to the new information before control is returned to the author/edit screen 72. The CMR accomplishment mode allows the author to enter CMR information into the procedure without actually including the entry steps in the procedure. When the author has finished entering the information and exited CMR accomplishment mode, the hardware is updated to the new information so that the author can continue on from the desired state.

The authoring function also includes the capability to print a version of the procedure that has been authored. This is referred to as an annotated events table report (AETR). The learn mode courseware tool 10 authoring/editing function will allow a function key PF4 available for use at any time, which allows the author to print an AETR of all authored events. The print function shall send the necessary data to the central computer 12 for output on the central computer printer (not shown).

The second primary function is the editing function. To make changes to the procedure an edit capability will, to the user, process information in the same manner as the authoring mode. The editing function allows steps to be inserted, deleted and modified in the procedure while simulation stays in sync to present the appropriate responses. In addition, the editing function will allow audio and video programs to be simulated by stubs until they are generated.

Save points may also be defined by the user during the editing function. An automatic save point is set to the previous event after each new event is performed. The learn mode courseware tool 10 will allow the author to define save points via a "save point?" prompt on the author/edit screen 72. The learn mode courseware tool 10 will allow the author at any time to return to either (1) the beginning of the procedure, (2) the previous event, or (3) an author-specified save point. Save points will not be active in the free play mode.

The editing function also includes the capability of automatically handling a single event delete without going back to an author-specified save point or the beginning of the procedure. Simulation shall respond appropriately when an event is deleted.

The editing function also includes the capability of allowing the software courseware test bed procedure monitor (PM) to read the newly edited annotated events table or translated annotated events table.

The learn mode courseware tool 10 will also be capable of editing multiple procedures at a time. That is, if there are calls to another procedure within a procedure, the learn mode courseware tool 10 will allow the user to concurrently edit the secondary procedure. When a call to another procedure is made (the "link" verb is used in the "action" field of the author/edit screen 72), the function shall query the author as to whether or not secondary procedure editing is desired. If the response is no, then control shall return to the author/edit screen 72 and processing shall continue. If the response is yes, then control shall return to the author/edit screen 72 at event one of the "linked-to" procedure. Processing shall continue for the "linked-to" procedure until the author links to another procedure, processes an end action or enters "do". When an end action is processed, control will return to the linked from procedure. The editing function includes the capability of handling up to ten procedures being edited at one time.

The third primary function is the testing function. After the procedure has been authored/edited, the testing function provides the capability to play back and test the procedure to observe instructional feedback and simulation responses to procedure actions. This will be possible by replaying the entire procedure or by using go to's and save points to isolate specific portions for playback. Again, simulation will stay in sync to provide correct responses during playback and test.

A single event execution capability will permit the author to proceed through events in a procedure using single steps, while simulation remains in sync. An event trace is also provided which will display logic decisions, the current event list, and current position in the procedure. Temporary save points may be set and changed in the testing function. The temporary save points will not affect any of the save points set during authoring. A history of what has been done may be printed. The print function will send the necessary data to the central computer 12 printer for output on the central computer printer. The versatile realtime executive (VRTX) operating system shall reside in the software courseware test bed and provide the environment for the learn mode courseware tool 10 and secondary functions. The secondary function characteristics will conform to those specified herein.

Courseware procedures will also be generated by data entering an annotated events table through data entry terminals using the procedure data entry function. This annotated events table describes the correct actions to be undertaken by the student, and together with the correct logical frames describes the instructional responses of the trainer. All procedures developed using procedure data entry shall operate under learn mode courseware tool 10 and all procedures developed using learn mode courseware tool 10 shall operate under procedure data entry.

A controller for the monitors 18, 20, 26 of the software courseware test bed shall have the capability to control the emulation of any of the computerized trainers. The control of this emulation will allow all of the displays of each trainer to be viewed by the user by use of a toggling function in glass I/O or instructional features. Hardware input and output are modeled on glass for the emulation of the trainers. A display for providing assistance in developing the courseware will also be provided. The monitor controller will have the capability to take the normal output of the procedure and to re-direct it to the software courseware test bed displays in a fashion that will allow all trainer displays to be examined during courseware authoring, editing, or testing.

An annotated events table compiler will take the annotated events table created by the learn mode courseware tool 10 and will create a translated annotated events table.

The present invention provides a learn mode courseware tool 10 which reduces the turn around time to author, edit and test courseware procedure. In addition, the learn mode courseware tool 10 reduces development time by providing feedback to the author as the procedure is being developed. Those skilled in the art can appreciate that other advantages can be obtained from the use of this invention and that modification can be made without departing from the true spirit of the invention after studying the specification, drawings, and following claims.

What is claimed is:

1. A method for authoring a training courseware, including instructional materials, for a training system, the training system including a simulation of an operating environment in which a student is to be trained, said operating environment having manipulable controls, said simulation including a database containing audio, video, graphics and procedure elements, said video elements simulating said operating environment and said graphics simulating said manipulable controls, said method comprising computer implemented steps of:

analyzing the training courseware required, including establishing the extent of any new training courseware or any changes required to previously authored portions of said training courseware, and developing a plan for implementation;

implementing the plan specified in the step of analyzing, including creating the training courseware required in conjunction with the training system simulation and performing changes to the audio, video and graphics elements;

testing said created training courseware and performed changes to the audio, video and graphics elements;

changing the training system procedure element by integrating said tested training courseware and audio, video and graphics changes into the training system procedure element; and approving said training courseware and said changes and releasing said training courseware and said changes to a control librarian.

2. The method of claim 1 further comprising the step of providing a user interface for performing the analyzing step, comprising the steps of:

presenting a preamble screen to a user for prompting the user to select a particular training procedure;

presenting an author/edit screen to the user for prompting the user to select one of said simulated manipulable controls; and presenting a test screen to said user for permitting said user to select a portion of said training procedure to test.

3. The method of claim 2 wherein said step of presenting an author/edit screen further comprises the step of providing a touch sensitive screen for permitting said user to select one of said manipulable controls.

4. The method of claim 1 wherein said step of performing changes to the audio, video and graphics elements includes the step of simulating said video, audio and graphics elements by stubs when said training system procedure element is changed if said video, audio and graphics changes are incomplete.

5. The method of claim 1 wherein said step of testing said simulated changes further comprises the step of editing the changes before integrating them into the training system procedure.

6. A system for authoring a training courseware, including instructional materials, for a training system, the training system including a simulation of an operating environment in which a student is to be trained, said operating environment having manipulable controls, said simulation including a database containing audio, video, graphics and procedure elements, said video elements simulating said operating environment and said graphics simulating said manipulable controls, comprising:

means for creating a training courseware and for developing an implementation plan, including means for establishing the scope of the training courseware or any changes required to previously created portions of the training courseware, said creating and developing means being coupled to the training system;

said creating means including means for operating the training system simulation and means for performing changes to the audio, video and graphics elements;

means for testing said created training courseware and performed changes to the audio, video and graphics elements, said testing means being coupled to the creating means; and means for changing the training system procedure element including means for integrating said tested training courseware and audio, video and graphics changes into the training system procedure element, said changing means being coupled between the testing means and the training system.

7. The system of claim 6 further comprising means for approving said training courseware and said changes and releasing said training courseware and said changes to a control librarian, said approving means being coupled to the testing means.

8. The system of claim 6 further wherein said creating means further comprises a user interface, said user interface including a preamble screen for prompting a user to select a particular training courseware;

an author/edit screen for prompting the user to select said simulated manipulable controls; and a test screen for enabling the user to select a portion of a training courseware to test.

9. The system of claim 8 wherein said user interface includes a monitor with a touch sensitive screen for selecting said simulated manipulable controls.

* * * * *